(12) United States Patent
Mehendale et al.

(10) Patent No.: US 11,208,274 B2
(45) Date of Patent: Dec. 28, 2021

(54) ELECTROMAGNETIC CONVEYOR SYSTEM

(71) Applicant: Laitram, L.L.C., Harahan, LA (US)

(72) Inventors: Aditya Mehendale, Geldrop (NL); Ewout Peter van der Laan, Eindhoven (NL); Funda Sahin-Nomaler, Eindhoven (NL); Pieter Aarnout Klop, Waalre (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/982,826

(22) PCT Filed: Jan. 11, 2019

(86) PCT No.: PCT/US2019/013124
§ 371 (c)(1),
(2) Date: Sep. 21, 2020

(87) PCT Pub. No.: WO2019/199363
PCT Pub. Date: Oct. 17, 2019

(65) Prior Publication Data
US 2021/0053776 A1    Feb. 25, 2021

Related U.S. Application Data

(63) Continuation-in-part of application No. 15/953,127, filed on Apr. 13, 2018, now Pat. No. 10,457,497.

(51) Int. Cl.
*B65G 54/02*    (2006.01)
*B65G 47/53*    (2006.01)

(52) U.S. Cl.
CPC .............. *B65G 54/02* (2013.01); *B65G 47/53* (2013.01); *B65G 2201/0252* (2013.01)

(58) Field of Classification Search
CPC ................... B65G 54/02; B65G 47/53; B65G 2201/0252; B65G 47/24; B65G 47/244; B65G 47/088; B65G 35/06; B08B 9/44
(Continued)

(56) References Cited

U.S. PATENT DOCUMENTS 2,697,513 A    12/1954 Krupp et al.
2,857,059 A    10/1958 Goerlich et al.
(Continued)

FOREIGN PATENT DOCUMENTS

DE         9417849.6 U1    2/1995
DE      10-2005044476 A1    3/2007
(Continued)

*Primary Examiner* — Gene O Crawford
*Assistant Examiner* — Lester Rushin, III
(74) *Attorney, Agent, or Firm* — James T Cronvich (57) ABSTRACT

A conveyor system for conveying electrically conductive articles such as aluminum bottles or cans. The conveyor system comprises a plurality of coils below the top surface of an electromagnetic conveyor at a junction between an infeed conveyor and a discharge conveyor. The coils propagate electromagnetic flux waves that induce currents in the electrically conductive articles that force the articles to follow a conveying path from the infeed to the discharge conveyor. Dead spots on the electromagnetic conveyor can be eliminated by adjusting the coil drive waveforms. And a long electromagnetic conveyor driven by a train of narrow pulses is used to singulate electrically conductive articles.

12 Claims, 12 Drawing Sheets

(58) Field of Classification Search
USPC ....... 198/394.4, 350, 370.13, 381, 407, 410, 198/412, 434, 456, 457.01, 457.06, 690.1
See application file for complete search history.

(56) References Cited

U.S. PATENT DOCUMENTS

| | | | |
|---|---|---|---|
| 3,830,353 | A | 8/1974 | Mojden |
| 4,069,145 | A | 1/1978 | Sommer, Jr. et al. |
| 4,351,430 | A | 9/1982 | Mojden |
| 4,369,873 | A | 1/1983 | Heuft |
| 4,613,805 | A | 9/1986 | Matsuo et al. |
| 4,704,568 | A | 11/1987 | Beck et al. |
| 4,823,931 | A | 4/1989 | Rhodes et al. |
| 4,850,542 | A | 7/1989 | Rechsteiner |
| 5,251,741 | A | 10/1993 | Morishita et al. |
| 5,483,042 | A | 1/1996 | Sprenger et al. |
| 5,542,356 | A | 8/1996 | Richert et al. |
| 5,690,851 | A | 11/1997 | Yoshioka et al. |
| 6,354,224 | B1 | 3/2002 | Devnani et al. |
| 7,249,672 | B2 | 7/2007 | Heimsoth |
| 7,832,548 | B2 | 11/2010 | Mueller et al. |
| 7,863,782 | B2 | 1/2011 | Matscheko et al. |
| 9,060,390 | B2 | 6/2015 | Rudnev et al. |
| 9,108,807 | B1 | 8/2015 | Ogle, II |
| 9,187,268 | B2 * | 11/2015 | Denninger ............. B65G 43/00 |
| 9,346,623 | B2 | 5/2016 | Ragan |
| 2002/0046923 | A1 * | 4/2002 | Herubel ............... B65G 47/682 198/444 |
| 2008/0302634 | A1 | 12/2008 | Costanzo et al. |
| 2010/0200370 | A1 | 8/2010 | Rausch et al. |
| 2014/0102857 | A1 | 4/2014 | Heinsohn et al. |
| 2015/0321854 | A1 * | 11/2015 | Ragan ................... B65G 47/66 198/617 |
| 2017/0038244 | A1 | 2/2017 | Kleczewski |
| 2017/0252784 | A1 | 9/2017 | Ragan |
| 2017/0334663 | A1 | 11/2017 | Ragan et al. |
| 2020/0307920 | A1 * | 10/2020 | Ragan ................... B65G 54/02 |

FOREIGN PATENT DOCUMENTS

| | | |
|---|---|---|
| FR | 2087171 A | 12/1971 |
| FR | 2273739 A1 | 2/1976 |
| FR | 2730876 A1 | 2/1995 |
| JP | 57-170324 A | 10/1982 |
| JP | 63202261 | 8/1988 |
| JP | 01-133817 A | 5/1989 |
| JP | 2005026920 U | 4/1993 |
| JP | H07-8331 U | 2/1995 |
| JP | 07-163017 A | 6/1995 |
| JP | 2008163712 A | 6/1996 |
| JP | 2004083230 A | 3/2004 |
| JP | 2006206229 A | 8/2006 |
| JP | 2014024558 A | 2/2014 |
| WO | 97/27132 A1 | 7/1997 |
| WO | 01/27008 A1 | 4/2001 |
| WO | 2010049019 A1 | 5/2010 |
| WO | 2014043821 A1 | 3/2014 |
| WO | 2015148833 A1 | 10/2015 |

\* cited by examiner

ELECTROMAGNETIC CONVEYOR SYSTEM

BACKGROUND

The invention relates generally to power-driven conveyors and more particularly to conveyors conveying electrically conductive articles, such as cans, electromagnetically. Conveyors are used to transport articles through manufacturing processes. The transport of empty aluminum beverage cans can be difficult in transitions where the cans are transferred from one conveyor to another. The lightweight cans are prone to tipping at the transitions and to stranding on transfer dead plates. Cans are also subject to tipping if accelerated to high speeds on long runs. Manual intervention is required to deal with toppled and stranded cans. But manual intervention increases manufacturing costs and risks contamination of the cans. And if not dealt with, the stranding of cans can result in the costly mixing of can batches.

SUMMARY

One version of a conveyor system embodying features of the invention comprises a first conveyor conveying electrically conductive articles in a first direction to an exit end, a second conveyor conveying the electrically conductive articles from an entrance end in a second direction different from the first direction, and a diverter forming a junction between the exit end of the first conveyor and the entrance end of the second conveyor The diverter includes an entrance adjacent to the exit end of the first conveyor receiving the electrically conductive articles on a top surface from the exit end of the first conveyor and an exit adjacent to the entrance end of the second conveyor. Coils are arranged in a matrix of contiguous first and second zones below the top surface. The coils in each of the first zones produce an electromagnetic flux wave that forces the electrically conductive articles on the top surface above the zone to move in the first direction. The coils in each of the second zones produce an electromagnetic flux wave that forces the electrically conductive articles on the top surface above the zone to move in the second direction. At least some of the zones along the entrance are first zones and at least some of the zones along the exit are second zones. The electrically conductive articles are directed from the entrance to the exit by the coils in the first and second zones and onto the second conveyor.

Another version of a conveyor system embodying features of the invention comprises a first conveyor conveying electrically conductive articles in a first direction to an exit end and a second conveyor conveying the electrically conductive articles from an entrance end in a second direction. The angle θ between the first direction and the second direction is given by $0°<\theta\leq 90°$. A diverter forms a junction between the exit end of the first conveyor and the entrance end of the second conveyor. The diverter includes an entrance adjacent to the exit end of the first conveyor receiving the electrically conductive articles on a top surface from the exit end of the first conveyor and an exit adjacent to the entrance end of the second conveyor. Coils arranged in parallel below the top surface produce an electromagnetic flux wave that forces the electrically conductive articles on the top surface above the coils to move in a third direction. The angle α between the first direction and the third direction is given by $0°<\alpha<\theta$. The electrically conductive articles are directed from the entrance to the exit by the coils and onto the second conveyor.

Yet another version of a conveyor system embodying features of the invention comprises a first conveyor conveying electrically conductive articles in a first direction to an exit end, a second conveyor conveying the electrically conductive articles from an entrance end in a second direction different from the first direction, and a diverter forming a junction between the exit end of the first conveyor and the entrance end of the second conveyor. The diverter includes an entrance adjacent to the exit end of the first conveyor receiving the electrically conductive articles on a top surface from the exit end of the first conveyor and an exit adjacent to the entrance end of the second conveyor. Coils are arranged in an arc below the top surface from the entrance to the exit. In a plan view perpendicular to the top surface, each of the coils has a narrow end at the inside of the arc and an opposite wider end at the outside of the arc. The electrically conductive articles are directed from the entrance to the exit by the coils and onto the second conveyor.

Another version of a conveyor system embodying features of the invention comprises an electromagnetic conveyor that includes an entrance over which electrically conductive articles are transferred onto a top surface and an exit over which electrically conductive articles are transferred off the top surface. Coils are arranged below the top surface in an array and produce electromagnetic flux waves causing forces that move the electrically conductive articles across the top surface from the entrance to the exit. A controller drives the coils with drive waveforms characterized by periodic pulses that periodically increase the forces acting on the electrically conductive articles in low-force regions on the top surface to enhance movement of the electrically conductive articles.

Still another version of a conveyor system embodying features of the invention comprises an electromagnetic conveyor that includes a top surface, an entrance over which electrically conductive articles are transferred onto the top surface, an exit over which electrically conductive articles are transferred off the top surface, and a plurality of coils arranged below the top surface in individual zones. The coils produce electromagnetic flux waves causing forces that move the electrically conductive articles through the zones across the top surface from the entrance to the exit. Controllers associated with the zones drive the coils with drive waveforms having different frequencies or phase angles in adjacent zones to enhance movement of the electrically conductive articles.

Yet another version of a conveyor system embodying features of the invention comprises an electromagnetic conveyor that includes a top surface extending in width from a left side to a right side and in length in a transport direction from an entrance to an exit. Electrically conductive articles, such as aluminum bottles or cans, are transferred onto the top surface at the entrance and transferred off the top surface at the exit. Coils arranged below the top surface produce electromagnetic flux waves that produce actuation forces to move the electrically conductive articles across the top surface from the entrance to the exit. A controller drives the coils with periodic pulses having a peak amplitude and a duty cycle that produce an average actuation force against the electrically conductive articles that exceeds the friction force between the top surface and the electrically conductive articles.

DETAILED DESCRIPTION

Figure 1:
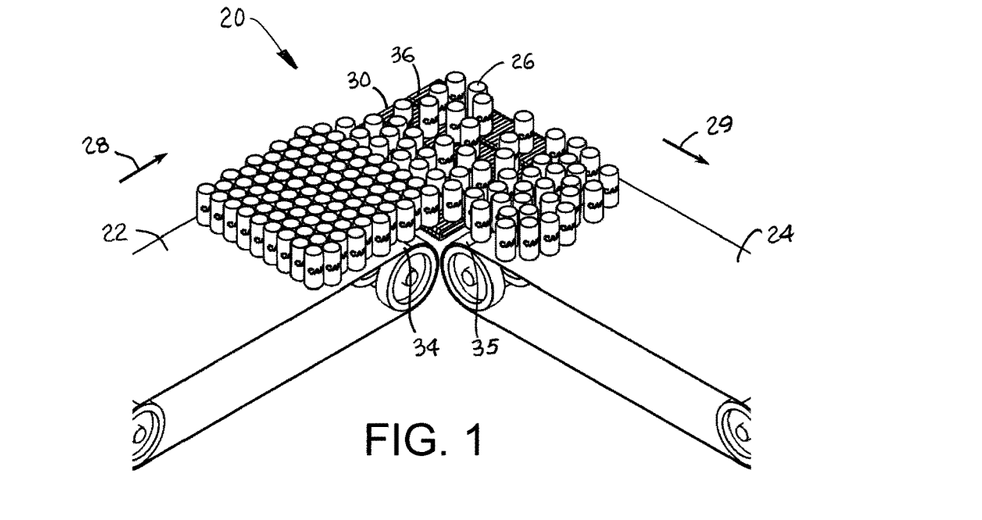
FIG. 1 is an isometric view of a portion of a conveyor system embodying features of the invention for conveying electrically conductive articles, such as cans.
Figure 2:
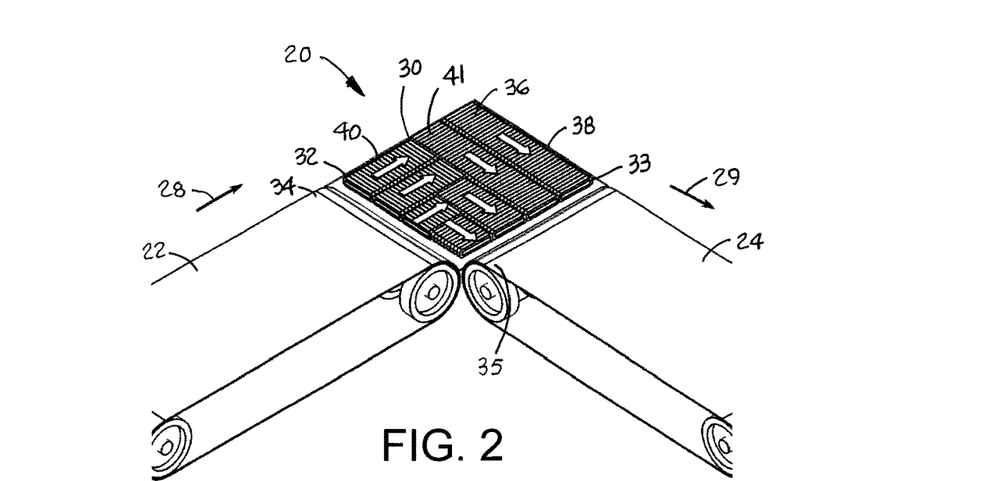
FIG. 2 is an isometric view of the conveyor system of FIG. 1 with the cans removed.

A conveyor system embodying features of the invention is shown in FIGS. 1 and 2. The conveyor system 20 has an infeed conveyor 22 and an outfeed, or discharge, conveyor 24—both shown as belt conveyors in this example. The infeed conveyor 22 conveys electrically conductive articles, such as aluminum cans 26, in a first conveying direction 28 to an electromagnetic conveyor 30. In this example the electromagnetic conveyor is configured as a diverting conveyor, or diverter, having an entrance 32 adjacent to an exit end 34 of the infeed conveyor. The discharge conveyor 24 receives the cans 26 at an entrance end 35 over an exit 33 of the diverter 30. In this example, the diverter 30 is rectangular—more precisely, square—with the entrance 32 and the exit 33 on adjacent sides. The discharge conveyor 24 conveys the cans 26 in a second conveying direction 29 different from the first conveying direction 28. The diverter 30 diverts the cans 26 on its top surface 36 from the first conveying direction 28 to the second conveying direction 29. In this example the diverter 30 serves as a 90° corner unit forming a junction between the exit end 34 of the infeed conveyor 22 and the entrance end 35 of the discharge conveyor 24. Although the infeed and outfeed conveyors 22, 24 are shown as belt conveyors in this example, they could be any kind of conveyor that is suitable for conveying the particular electrically conductive articles being handled. And the electromagnetic conveyor 30 can instead be configured as an in-line conveyor in which the cans are not turned but pass straight through to a discharge conveyor in line with the infeed conveyor.

As FIG. 2 shows, the diverter 30 has a plurality of coils 38 arranged below the top surface 36 in a matrix of contiguous zones: first zones 40 and second zones 41. The coils 38 in the first zones 40 produce electromagnetic flux waves that force the cans in the first zones to move in the first conveying direction 28 as indicated by the arrows depicted in the zones. The coils 38 in the second zones 41 produce electromagnetic flux waves that force the cans in the second zones to move in the second conveying direction 29. The electromagnetic flux waves produced by the coils 38 in both zones 40, 41 propagate in the corresponding first or second conveying direction 28, 29 and induce currents in the electrically conductive cans 26. The induced currents produce induced secondary fields that interact with the primary fields of the flux waves to create the force acting on the cans to move them in the corresponding direction. Thus, the coils 38 in each zone serve as the stator of a linear induction motor (LIM) in which each of the electrically conductive cans 26 is analogous to a LIM rotor.

Figure 3:
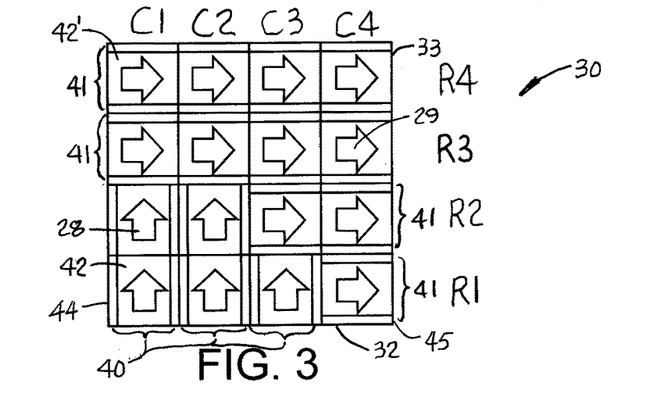
FIG. 3 is a top plan view of coil modules in a diverter as in the conveyor system of FIGS. 1 and 2.

Although the first and second zones 40, 41 in the diverter 30 can be of different lengths as in FIG. 2, each zone can be constructed of one or more identical coil modules 42, 42', as shown in FIG. 3. Coils in each coil module 42, 42' are housed in an enclosure or are embedded in a potted structure. The upper surfaces of the enclosures or structures can form the top surface 36 of the diverter 30 if they fit close together with narrow seams between adjacent coil modules 42, 42' to avoid tipping the cans 26. The top surface 36 of the diverter 30 can alternatively be formed by a sheet or other structure providing a flat conveying surface covering the coil modules 42, 42'. First coil modules 42 form the first zones 40, and second coil modules 42' form the second zones 41.

In this example the matrix of contiguous first and second zones 40, 41 is a square matrix of the identical coil modules 42, 42' arranged in four rows R1-R4 and four columns C1-C4. The rows R1-R4 are aligned in the second conveying direction 29 and perpendicular to the first conveying direction 28, and the columns C1-C4 are aligned in the first conveying direction and perpendicular to the second conveying direction. Furthermore, in this example, there are eleven second coil modules 42' forcing cans in the second direction 29 toward the exit 33 of the diverter 30 and five coil modules 42 forcing cans in the first direction 28 away from the entrance 32. The coil module 42' in the row R1 closest to the entrance 32 and the column C4 closest to the exit 33 is in a second zone 41. And all the coil modules 42' in the column C4 closest to the exit 33 are in second zones 41. Three of the four coil modules in the row R1 closest to the entrance 32 of the diverter 30 are in first zones 40.

In this particular arrangement of coil modules 42, 42' and zones 40, 41, the number of coil modules in contiguous first zones 40 decreases monotonically row by row away from the entrance 32. (The row R1 closest to the entrance 32 has three coil modules 42 in first zones 40; the next row R2 has two; and the third and fourth rows R3, R4 have none.) Cans fed onto the left side of the diverter 30 at the entrance 32 are pushed in the first zones 40 in the leftmost columns C1, C2 toward the second zones 41 in the far rows R3, R4. Cans immediately to the right of those are pushed in the first zone 40 on the entrance row R1 and the third column C3 to the second zone 41 in the second row R2. Cans fed onto the diverter 30 along its right side 45 and received in the second zone 41 are pushed immediately toward the exit 33. In this way cans closer to the right side 45 of the diverter 30 make a sharper turn to the right than those cans closer to the left side to help maintain the width of the mass of cans.

Of course, other arrangements of the zones and coil modules are possible. For example, the coil module in the first row R1 and the fourth column C4 could be in a first zone to help induce cans onto the diverter 30 before their direction is changed. As another example, the matrix of zones could be arranged as a non-square rectangular array of coil modules. Or each zone could be made of a single coil module whose length defines the length of the zone. And the number of zones and coil modules could be greater or less than shown in FIGS. 1-3. An in-line electromagnetic conveyor is constructed with all the coil modules in a single zone or in multiple zones all directing cans in the same direction from the entrance to an opposite exit without a change in direction.

Figure 4A:
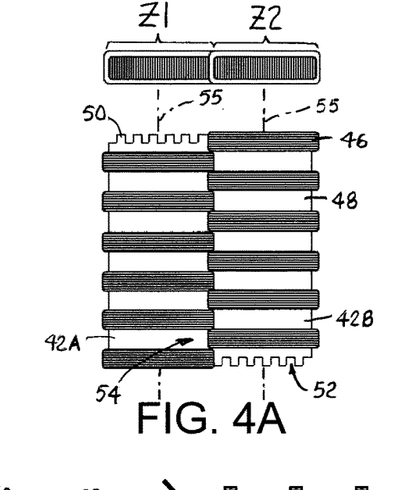
FIGS. 4A and 4B include elevation and top plan views of adjacent coil modules in two different electromagnetic conveyors usable in a conveyor system as in FIG. 1.
Figure 4B:
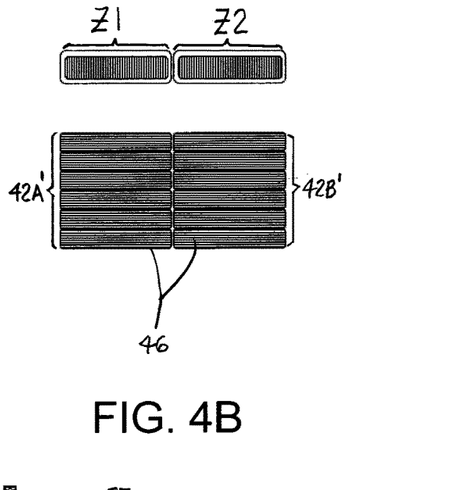

FIGS. 4A and 4B show two different side-by-side coil arrangements as part of a diverter or as all or part of an in-line conveyor. FIG. 4A shows two side-by-side coil modules 42A, 42B in adjacent zones Z1, Z2. Each coil 46 is wound around a core 48: for example, a laminated iron core such as a silicon-iron (SiFe) core. In this example each coil module 42A, 42B has six coils 46. Opposite ends of the cores 48 have a stepped structure of alternating protrusions 50 and recesses 52 that mate with the protrusions and recesses of the core of an adjacent coil module to form a longer zone. The coils 46 on each core 48 are spaced apart across gaps 54. The ends of the coils 46 of side-by-side coil modules 42A, 42B are offset along the coils' magnetic axes 55 to fit in the gaps 54. The resulting overlap of the coil ends helps eliminate dead spots in low-force regions in the diverter. FIG. 4B shows two side-by-side coil modules 42A', 42B' in adjacent zones Z1, Z2. The coils 46 in each zone Z1, Z2 are wound around a single core and are closely spaced so that little of the core is uncovered by the windings. The coils 46 in the adjacent zones Z1, Z2 are individually side by side with no axial offset and do not overlap the ends of the coils in the abutting laterally adjacent zone.

Figure 5:
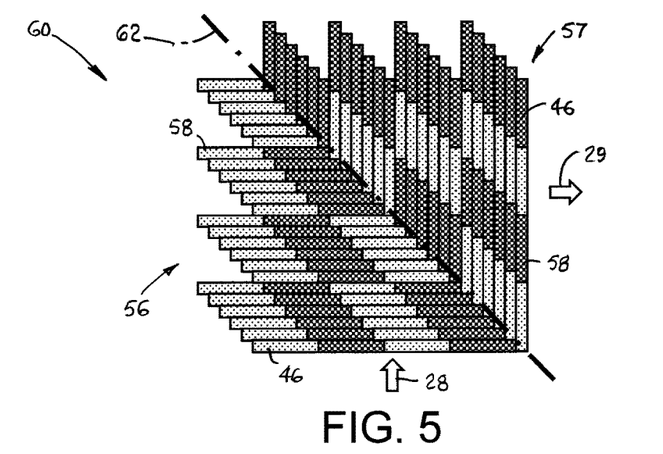
FIG. 5 is a top plan view of an electromagnetic diverter with staggered coils in coil modules usable as an alternative diverter in the conveyor system of FIG. 1.

FIG. 5 shows an alternative diverter 60 arrangement of staggered first and second zones 56, 57. Cans in the first zones 56 are moved in the first conveying direction 28 by the coils 46, and cans in the second zone 57 are moved in the second conveying direction 29. An oblique line of demarcation 62 separates the first zones 56 from the second zones 57. Each module 58 is parallelogram-shaped. The coils 46 in each module 58 are offset lengthwise from each other to form the stagger along lines parallel to the demarcation line 62 and oblique to the first and second conveying directions 28, 29. The staggered zones 56, 57 reduce low-flux areas in the diverter 60 compared to the rectangular zones in the diverter 30 of FIGS. 1-4.

Figure 6:
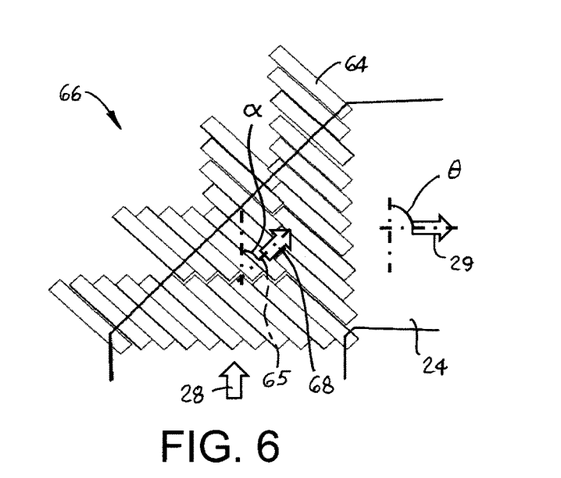
FIG. 6 is a top plan view of another version of a diverter having obliquely arranged coils alternatively usable in a conveyor system as in FIG. 1.

Another version of an electromagnetic diverter for electrically conductive articles is shown in FIG. 6. In this version all the coils 64 in the diverter 66 are arranged geometrically with their magnetic axes 65 parallel and oblique to the first and second conveying directions 28, 29. The flux wave produced by the oblique coils 64 travels in a third direction 68 oblique to the first and second directions 28, 29. The angle θ between the first and second directions 28, 29 is given by 0°<θ≤90°. In this example, θ=90°. The angle α between the first and third directions 28, 68 is given by 0°<α<θ. Cans fed onto the diverter 66 are immediately pushed diagonally toward the discharge conveyor 24 in the third direction 68.

Figure 7:
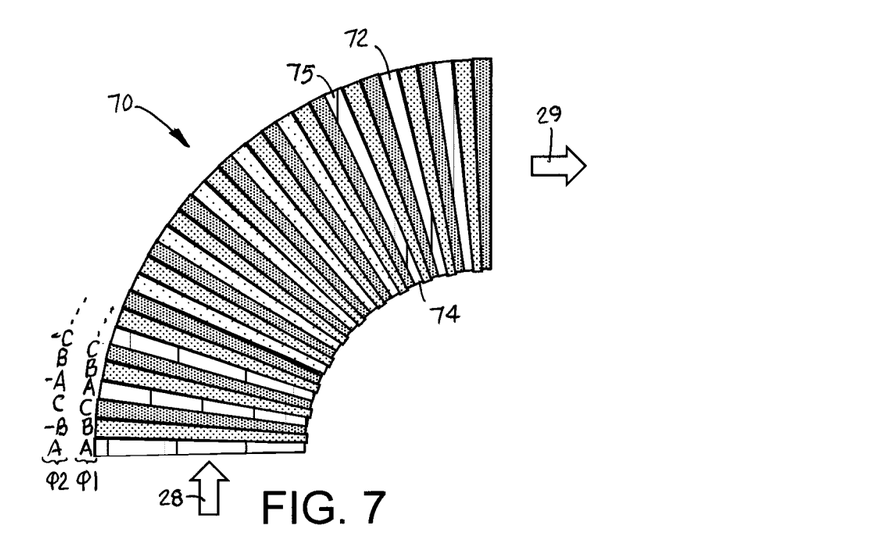
FIG. 7 is a top plan view of an alternative diverter with an arcuate arrangement of coils usable in a conveyor system as in FIG. 1.

Yet another version of an electromagnetic diverter is shown in FIG. 7. The diverter 70 defines a curved track. In this example the curved track is an arc subtending a 90° angle. Each of the coils 72 has a narrow end 74 at an inside of the arc and a wider end 75 at the outside of the arc. The coils 72 are driven by a three-phase coil drive according to the A-B-C phasing arrangement φ1. One alternative is driving the coils with an apparent six-phase coil drive sequence φ2, which can be achieved with a three-phase coil driver by alternating the winding polarities as indicated by the φ2 phase sequence.

Figure 8:
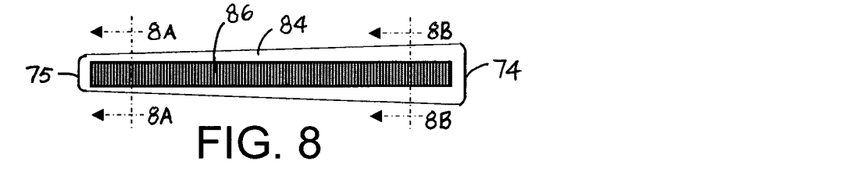
FIG. 8 is a side elevation view of a coil as in FIG. 7 with a uniform core thickness and a varying winding thickness.
Figure 8A:
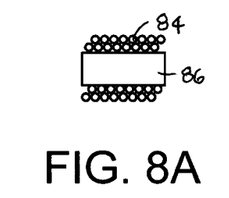
FIGS. 8A and 8B are cross sections of the coil of FIG. 8 viewed along sight lines 8A and 8B.
Figure 8B:
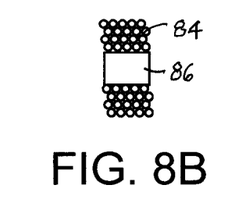
Figure 9:
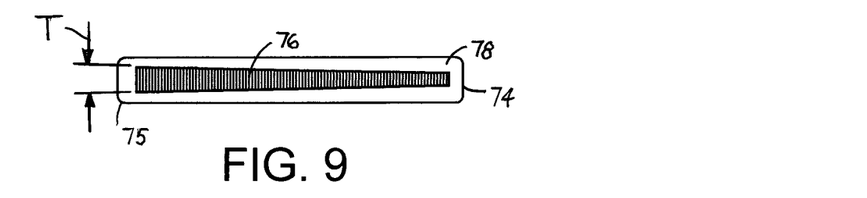
FIG. 9 is a side elevation view of a coil as in FIG. 7 with a tapered core thickness.
Figure 10:
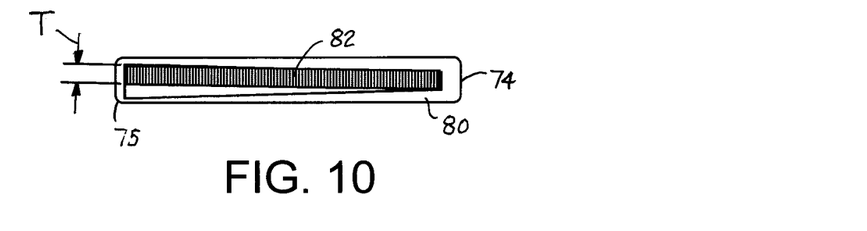
FIG. 10 is a side elevation view of a coil as in FIG. 7 with a uniform core and winding thickness.

FIGS. 8-10 show cross sections of alternative coils usable in the curved-track diverter 70 of FIG. 7. The coil 84 in FIG. 8 has a laminated core 86 of uniform thickness, i.e., constant height, along its length. As shown in the cross sections of the coil 84 in FIGS. 8A and 8B, the inside end 74 is laterally narrower than the wider outside end 75 and the narrow inside end 74 is taller than the wider outside end 75. The coil windings at the narrow inside end require more layers than at the wider outside end to keep a constant number of turns of a uniformly thick wire.

In FIG. 9 the stack of iron-core laminations 76 is tapered in thickness (height). The thickness T increases from the inside end 74 of the coil 78 to the outside end 75. Because the coil 78 is generally trapezoidal in a plan view—wider at the outside end 75 than at the inside end 74—the windings at the outside are distributed over a greater distance laterally, and so the depth of the winding layers is less to form the coil with a constant outer thickness (height) along its length.

Another alternative coil 80 is shown in FIG. 10. Like the coil 78 of FIG. 9, the coil 80 has a constant thickness (height) along its length. And the thickness T of the coil's laminated core 82 is also uniform along its length so that the ratio of the thickness of the coil to the thickness of the iron core is constant along the length of the coil 80. Because the outside end 75 of the coil 80 is wider, the coil windings are distributed laterally over a greater width and are not as deep as the winding layers at the narrower inside end 74.

Figure 11:
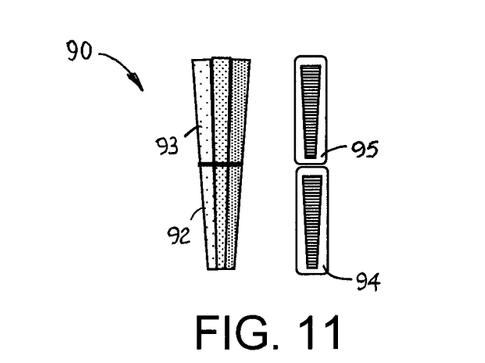
FIG. 11 includes top plan and side elevation views of a portion of an arcuate diverter as in FIG. 7, but with inner and outer coil sets.

FIG. 11 shows a portion of a curved diverter as an alternative to that of FIG. 7. The diverter 90 is constructed of two concentric arcs 92, 93 of coils 94, 95. (Only three coils are shown in each arc to simplify the drawing.) The inner arc 92 lies inside the outer arc 93.

Figure 12:
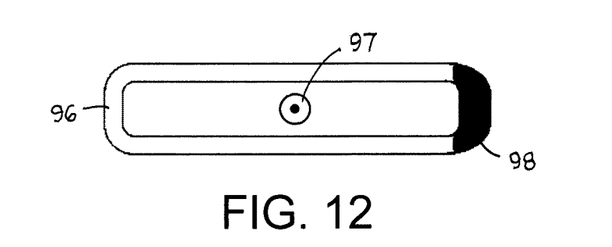
FIG. 12 is a side elevation view of a coil winding usable in a conveyor system as in FIG. 1 with a winding crossover region along a short side.
Figure 13:
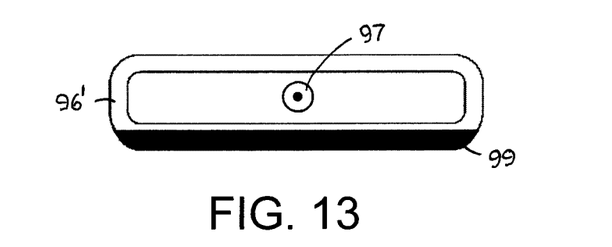
FIG. 13 is a side elevation view of a coil winding usable in a conveyor system as in FIG. 1 with a winding crossover region along a long side.

As shown in FIGS. 12 and 13, the coils 96, 96' for all the examples can be orthocyclically wound to minimize the volume occupied by the windings. In the rectangular coil configuration shown, the orthocyclic crossover region of the coils is confined to one side of the coil. In FIG. 12 the crossover region 98—i.e., the region where the windings cross over each other to achieve the tight packing of orthocyclic windings—is formed on one of the short sides. In FIG. 13 the crossover region 99 is formed on one of the long sides, such as the bottom side away from the top surface of the diverter to minimize the gap between the iron core and the conveyed articles and to minimize dead spots in the low-force boundary regions along the short sides of laterally adjacent coils where the net field strength required to move cans is low. The coils 96, 96' in FIGS. 12 and 13 have magnetic axes 97 directed along the length of the coils' cores and parallel to the top surface of the diverter.

Figure 14:
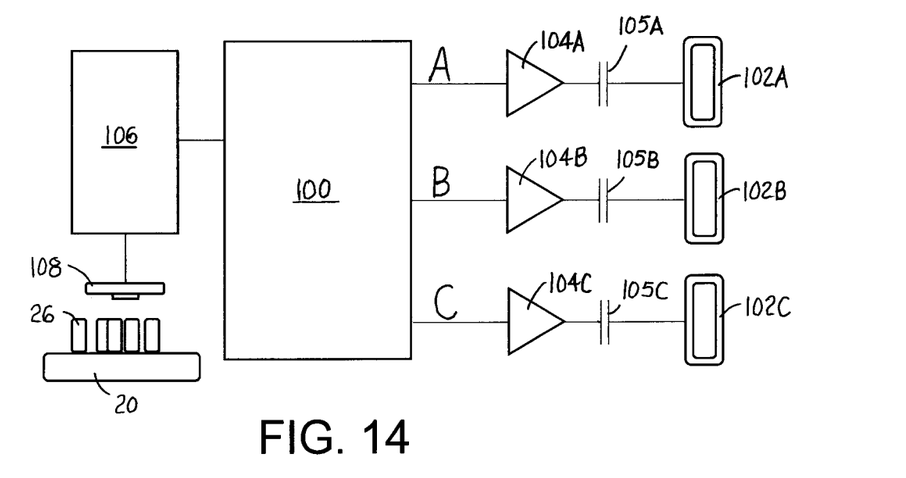
FIG. 14 is a block diagram of a drive system for a conveyor system as in FIG. 1.

A controller for driving the coils in all the examples is shown in FIG. 14. The controller 100 is a multiphase controller shown in this example as a three-phase controller operating as three current sources driving the coils 102A-C in each phase A, B, C through coil drivers 104A-C and series capacitors 105A-C. Each zone in the diverters of FIGS. 1-6 or in an in-line electromagnetic conveyor could have a dedicated controller. All the first zones of diverters could be driven electrically in parallel by a first single controller, and all the second zones could be driven by a second single controller. In-line conveyors and the diverters in FIGS. 6 and 7 could be driven by a single dedicated multiphase controller. And each arc in the diverter in FIG. 11 could be driven by its own multiphase controller.

Figure 15:
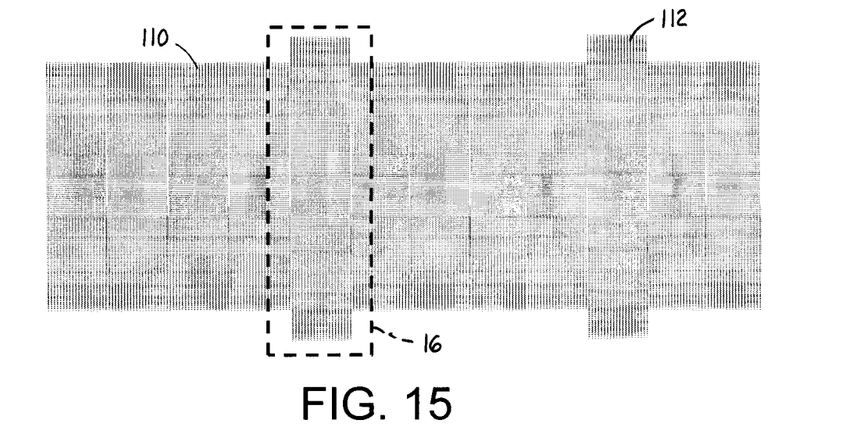
FIG. 15 shows one phase of a coil-drive waveform produced by the drive system of FIG. 14 using pulsed operation to eliminate dead spots.
Figure 16:
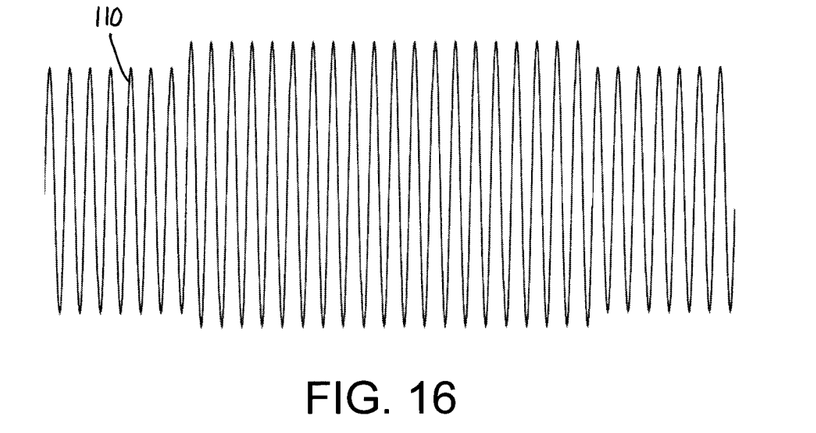
FIG. 16 shows a portion of the waveform of FIG. 15 enlarged.

A programmable processor 106 connected to the controller 100, can be connected to other such controllers to coordinate control of all the coil zones. Or the processor 106 could be integrated into each controller 100 instead. A vision system 108 including one or more cameras capturing digital images of the cans 26 in the zones on the conveyor 20 sends the captured images to the processor 106. From the images the processor 106 can detect stranded cans and flow problems and alter the normal coil drive sequence to remedy any problems. For example, one way that dead spots on a diverter or an in-line conveyor can be eliminated is by driving the coils with a waveform as shown in FIGS. 15 and 16. The standard ac drive waveform 110 for each phase is amplitude-modulated by a pulse train to produce periodic higher-power drive pulses 112. The periodic pulses can occur at fixed or varying rates. For example, FIGS. 15 and 16 show a 1 kHz drive waveform modulated by a fixed 8.3 Hz pulse train with a 17% duty cycle and a pulse-amplification factor of about 1.2. The capacitance C of the series capacitors 105A-C is selected to form a high-Q resonant circuit with the large inductance L of the coils 102A-C in each phase. The frequency f of the ac drive waveform 110 for each phase is set close to the circuit's nominal resonant frequency $f_r=1/[2\pi(LC)^{1/2}]$. Because of tolerances in the actual values of L and C and the fact that the coil drivers operate better driving inductive loads, the frequency f of the ac drive waveform is set close to, but slightly above, the nominal, or theoretical, resonant frequency $f_r$. The frequency f of the ac drive waveform is set high enough above the nominal resonant frequency $f_r$ to ensure that the reactive impedances X of all the coil circuits are positive, i.e., inductive, and that the drive frequency f is close to the circuit's actual resonance frequency—at least as close as the resonant circuit's upper half-power (3 dB) frequency—for any combination of coils and capacitors. In that way deviations and variations in the inductances and capacitances from their nominal values are accounted for, and the reactive impedances X do not dominate the resistive impedances R, i.e., $|X|/R<1.73$, or, in other words, the power factor is greater than 0.5. Coil drivers designed to drive capacitive loads with a drive waveform whose frequency f is slightly below the resonant frequency $f_r$ could alternatively be used in an analogous way to ensure that the reactive impedances X of all the coil circuits are negative, i.e., capacitive, and not dominant, and that the drive frequency f is close to the circuit's actual resonant frequency. As another alternative, one of ordinary skill in the art would be able to design a conventional closed-loop system to drive the coils at exactly the resonant frequency $f_r$, for which the reactive impedance X would be zero. Any of these resonant coil-driving schemes results in a non-dominant, zero or low reactive impedance and an efficient transfer of power to the coils. Exemplary pulse-repetition rates range from about 5 Hz to 20 Hz with a duty-cycle range of about 5% to 20%. Exemplary pulse-amplification factors range from about 1.2 to 1.5 or greater. The higher-amplitude coil-drive pulses 112 produce periodic increases in the magnetic field and the forces acting on cans slowed or stopped in otherwise low field-strength and force (dead spot) regions to move the cans. The pulsed operation can be run at a fixed pulse frequency and duty cycle, or the processor 106 can direct the controller 100 to produce drive pulses that clear the dead spot and otherwise enhance can movement when a stranded or slow-moving can is detected by the vision system 108. The advantage of applying short pulses to the ac drive waveform rather than operating permanently at a fixed, greater amplitude is that the short pulses free the stranded cans without significantly increasing the speed of the unstranded, moving cans, which can result in tipping.

Figure 17:
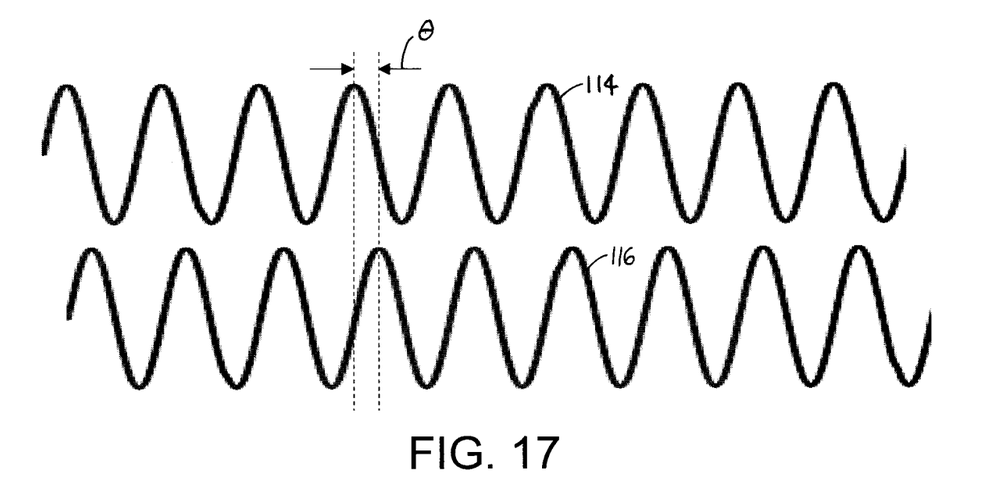
FIG. 17 shows corresponding phases of the coil-drive waveforms produced by the drive system of FIG. 14 for two adjacent coil zones to eliminate dead spots.

Another way of eliminating dead spots is by driving the coils in adjacent zones with phase-shifted waveforms as shown in FIG. 17. The upper waveform 114 represents the coil drive for one phase in a first zone; the lower waveform 116 represents the coil drive for the corresponding phase in an adjacent zone. The phases of the two waveforms differ by a phase angle θ, about 90° in this example. And the same phase shift would exist between the other phases in a multiphase system. The phase shift between the drive waveforms of adjacent zones clears cans from dead spots by creating a component of force that is perpendicular to the main conveying direction as a result of the interaction of the out-of-phase electromagnetic flux waves. The perpendicular component of force clears the dead spots between the adjacent zones. As in the other dead-spot-clearing techniques, the phase difference can be fixed or adjusted by the processor 106 when stopped or slow-moving cans are detected by the vision system 108.

Yet another way that dead spots can be eliminated is by operating coils in adjacent zones at different frequencies. For example, the coils in one zone could be driven by an 1100 Hz waveform and those in an adjacent zone by an 1102 Hz waveform. Like driving the coils in adjacent zones with a phase shift, driving the coils at different frequencies produces a force acting on the cans in a direction perpendicular to the conveying direction. The frequency difference can be fixed or can be imposed by the processor 106 when stranded cans are detected by the vision system 108.

All the dead-spot-clearing techniques are usable with electromagnetic diverters or with in-line or diverting electromagnetic conveyors to ensure the efficient conveyance of cans from the infeed conveyor to the discharge conveyor.

Figure 18A:
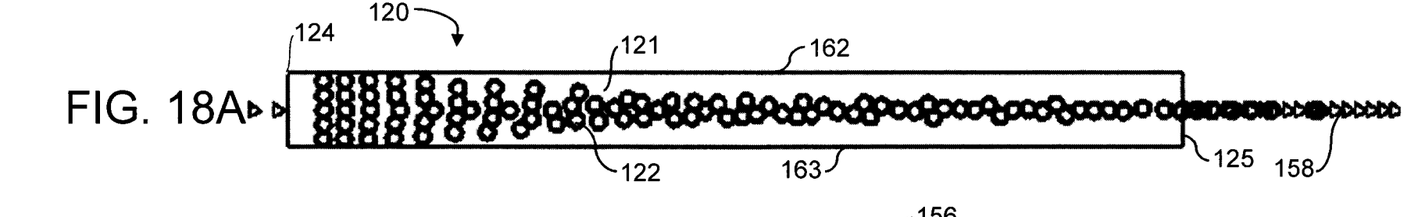
FIG. 18A is a top plan view of a one version of a singulating conveyor embodying features of the invention.

FIG. 18A shows a version of a conveyor system that includes an electromagnetic singulating conveyor. The electromagnetic conveyor 120 is designed to singulate a mass flow of aluminum beverage bottles or cans 122 at the entrance 124 of the conveyor into a single file at the exit 125. Like the previous electromagnetic conveyors, the singulating conveyor 120 has a network of coils arranged below the conveyor's top surface 121. Achieving singulation of a dense mass flow of cans requires a much longer conveyor than the diverting conveyors previously described. So, unlike the diverting conveyors, the length of the singulating conveyor 120 is much greater than its width. And because of the singulating conveyor's long length, the acceleration of the cans 122 must be low. The actuation forces produced by the three-phase drive (100, FIG. 14) for the various diverters are high to prevent the net force on the cans from dropping to zero and stranding cans at dead spots on the diverters' top surfaces. If the actuation forces produced by the three-phase drive 100 were applied to the long singulating conveyor 120, the cans 122 would be accelerated to a speed so great that the lightweight cans would tip over.

Figure 19A:
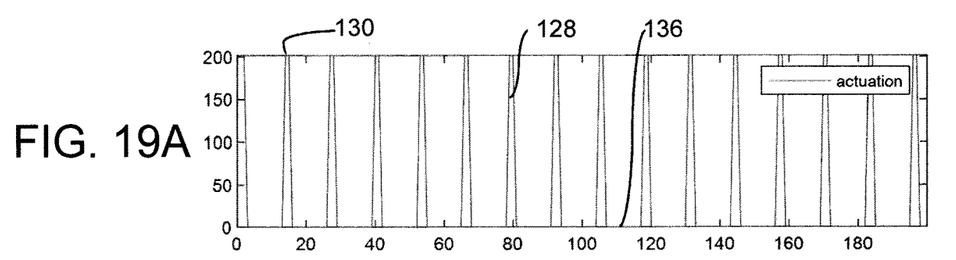
FIG. 19A is a time plot of the amplitude of drive pulses causing the actuation force acting on an electrically conductive article in a conveyor as in FIG. 18A.
Figure 19B:
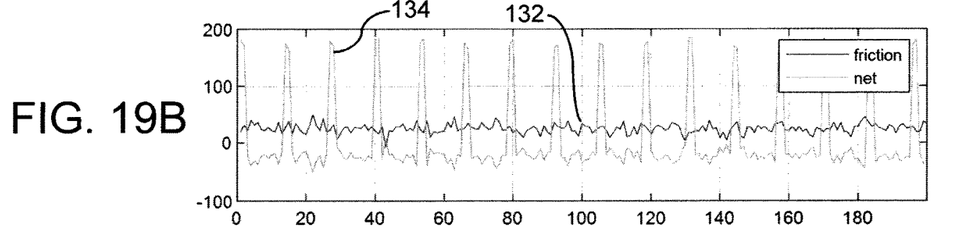
FIG. 19B is a time plot of the amplitude of a typical friction force acting on the electrically conductive article and of the amplitude of the net force acting on the articles.
Figure 19C:
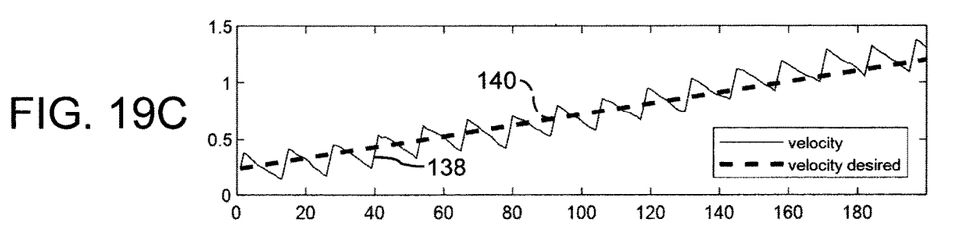
FIG. 19C is a time plot of the velocity of the article driven by the net force of FIG. 19B and of the desired velocity.
Figure 19D:
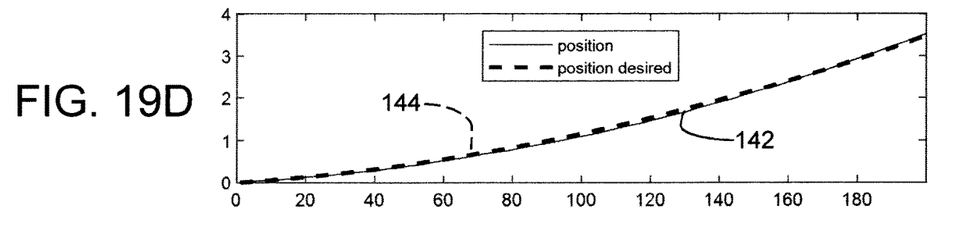
FIG. 19D is a time plot of the position of the article acted on by the net force of FIG. 19B and of the desired position.

One way to achieve low average acceleration and still overcome the friction forces between the cans 122 and the top surface 126 of the electromagnetic singulating conveyor 120 is to drive the coils with a train of drive pulses 128 producing actuation forces acting on the cans, as shown in FIG. 19A. The drive pulses shown have a high peak amplitude 130 producing an actuation force much greater than the friction force 132 acting on the cans, as shown in FIG. 19B. The net force 134 acting on the cans greatly exceeds the friction force and accelerates the cans in a well-defined manner during the duration of the drive pulses 128. So the drive pulses 128 have an amplitude 130 great enough to ensure that the net force 134 on the cans during the drive pulses is sufficiently greater than the friction force that friction does not affect the acceleration of the cans during the durations of the pulses. In the off-time 136 between drive pulses 128, the actuation force drops to zero, and the net force 134 on the cans is negative owing to friction. So, as shown in FIG. 19C, the velocity 138 of the cans increases during the pulses 128 and decreases during the off-times 136. And the velocity increases with each subsequent pulse to achieve an acceptable average acceleration indicated by the comparison of the actual can velocity 138 to the desired velocity 140. The result is a close match between the actual position 142 of the can and its desired position 144 as indicated by FIG. 19D.

If, for example, the friction force $F_F$ between the can and the top surface of the can is 25 mN and the average actuation force $F_A$ is 31 mN, the net force $F_N$ acting on the can is the difference, or 6 mN. One way to achieve a net force $F_N$ of 6 mN is with 2 ms actuation force pulses 128 having a peak amplitude of 186 mN and an off-time of 10 ms for a duty cycle of 16.7%. Other pulse widths, peak amplitudes, and duty cycles can be used depending on the application. Duty cycles of less than about 20%, pulse widths of less than about 5 ms, and pulse amplitudes producing a peak actuation force of at least three times the friction force are useful in singulating aluminum cans and bottles.

Figure 20:
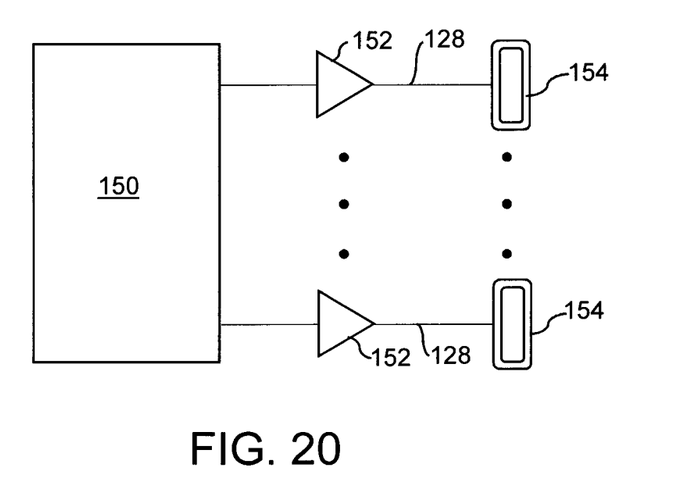
FIG. 20 is a block diagram of a pulse drive system for a conveyor as in FIG. 18A.

FIG. 20 shows a controller 150 supplying pulse signals to one or more amplifiers 152. The amplified drive pulses 128 drive the coils 154 under the top surface 121 of the electromagnetic conveyor 120 of FIG. 18A. All the coils can be pulsed simultaneously, or the pulsing can be phased by the controller 150 to distribute the amplifier load.

Figures 18B, 18C:
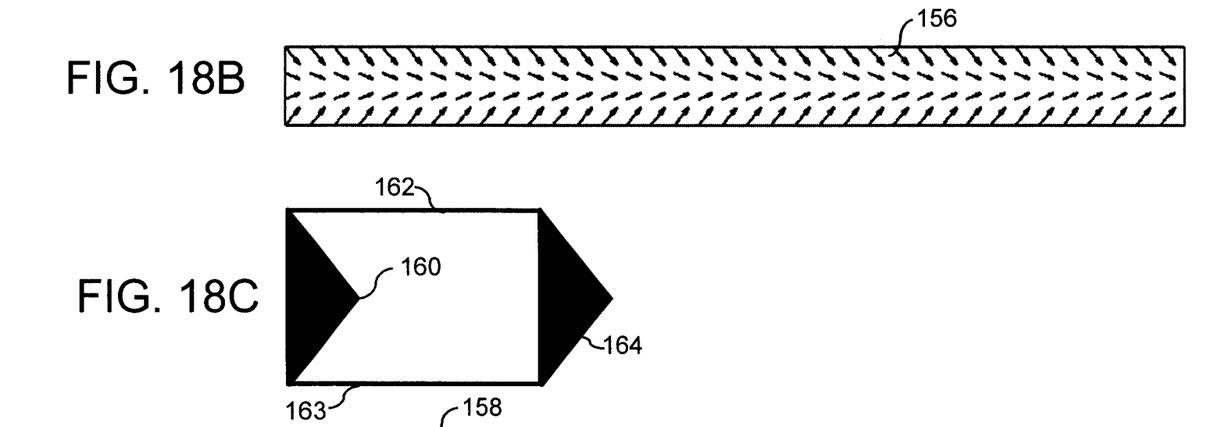
FIG. 18B is a schematic representation of the direction of the actuation force in the conveyor of FIG. 18A.
FIG. 18C is a schematic representation of the actuation force in the transport direction.
Figure 18D:
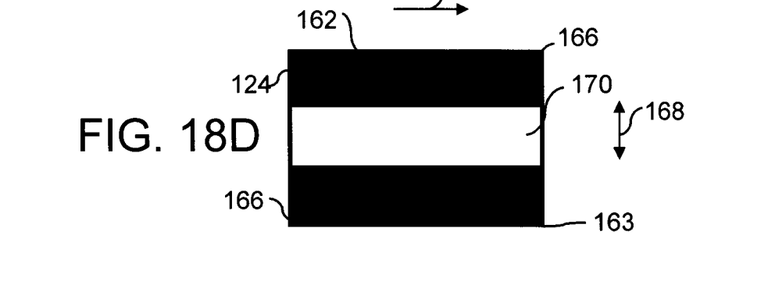
FIG. 18D is a schematic representation of the actuation force perpendicular to the transport direction.

To singulate the cans 122, the conveyor 120 of FIG. 18A is designed with a plurality of coils arranged to direct the cans 122 in the directions indicated by the arrows in FIG. 18B. The force pattern 156 produced by the pulsed coils is achieved by, for example, producing a greater force in the transport direction 158 at the center 160 of the conveyor 120 than at the left and right sides 162, 163. FIG. 18C indicates the magnitude of that force by the dark triangles 164. The triangles 164 indicate that the magnitude of the force in the transport direction 158 is greatest at the center 160 and decreases generally linearly to zero at the left and right sides 162, 163 along the length of the conveyor. The actuating-force component perpendicular to the transport direction, i.e., in the transverse direction 168, is indicated by the dark rectangles 166 in FIG. 18D. The rectangles 166 indicate that the actuating force in the transverse direction 168 is uniform along the length of the conveyor and directed away from the left and right sides 162, 163 over portions of the width of the conveyor, but is zero in a central region 170 of the conveyor. As FIG. 18A shows, the cans 122 are gradually pushed away from the left and right sides 162, 163 as they proceed along the length of the conveyor. The high actuation force along the center speeds up cans 122 in the transport direction 158 as they reach the central region to provide room for trailing, flanking cans to merge behind them toward the center.

Figures 21A, 21B:
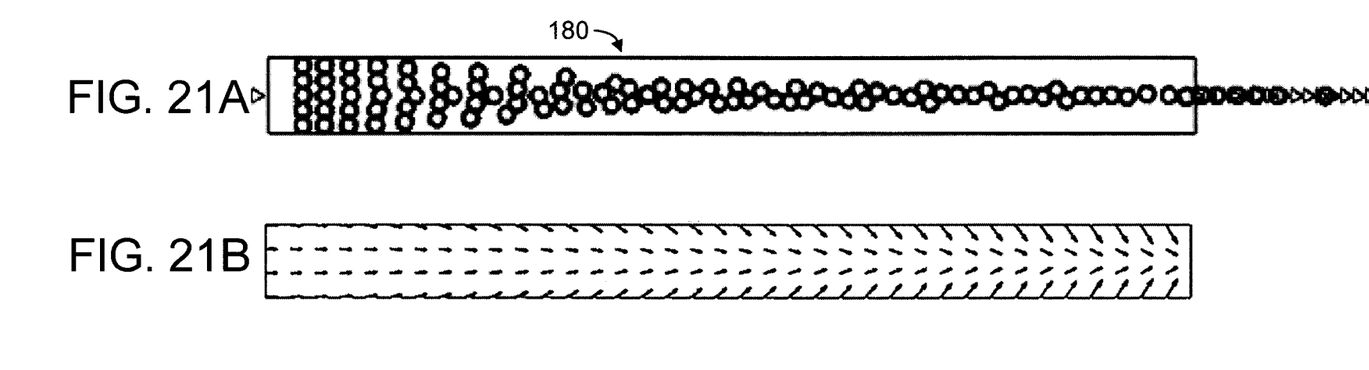
FIG. 21A is a top plan view of a second version of a singulating conveyor embodying features of the invention.
FIG. 21B is a schematic representation of the direction of the actuation force in the conveyor of FIG. 21A.
Figures 21C, 21D:
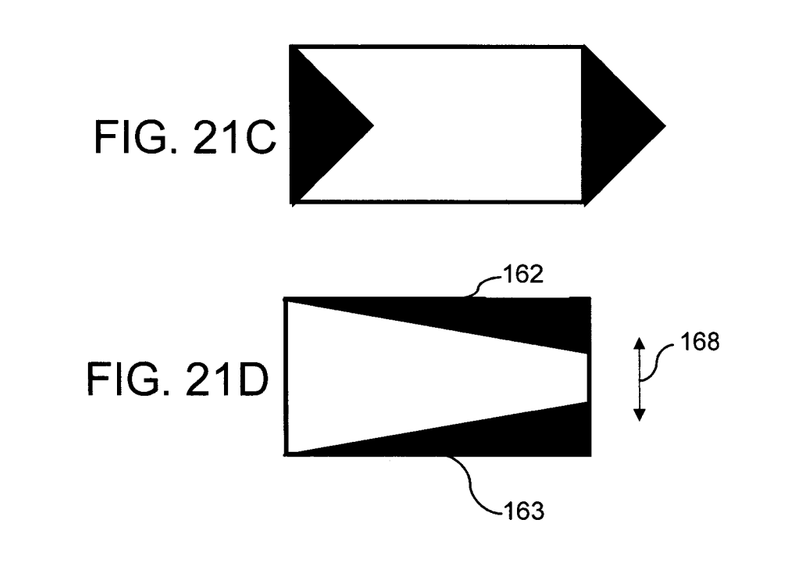
FIG. 21C is a schematic representation of the actuation force in the transport direction.
FIG. 21D is a schematic representation of the actuation force perpendicular to the transport direction.

The singulating conveyor 180 of FIG. 21A differs from the conveyor 120 of FIG. 18A in that the actuating force in the transverse direction 168 increases from the entrance 124 to the exit 125 as indicated by FIG. 21D. That pattern tends to separate the cans in the middle of the rows sooner before the outer cans are pushed toward the center of the conveyor 180.

Figure 22A:
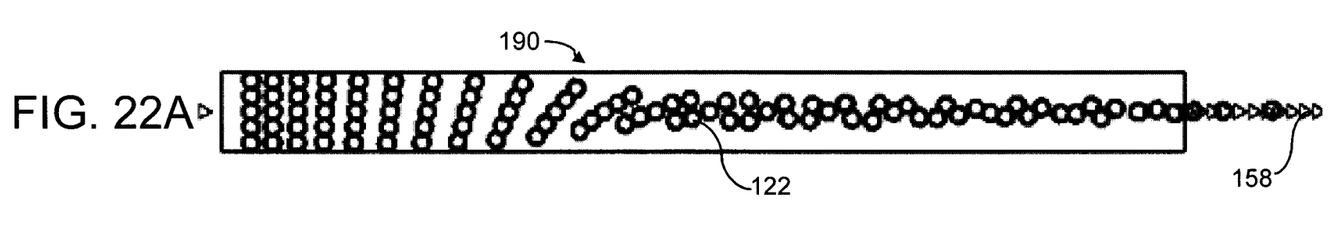
FIG. 22A is a top plan view of a third version of a singulating conveyor embodying features of the invention.
Figure 22B:
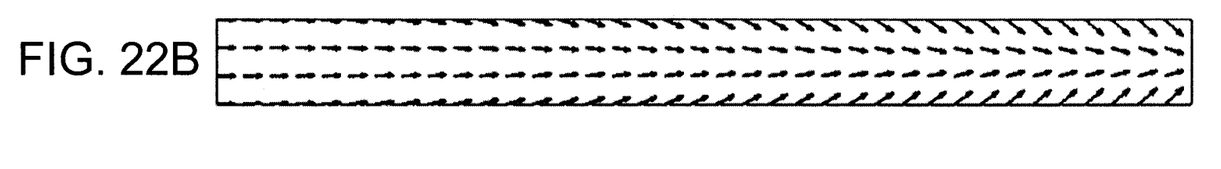
FIG. 22B is a schematic representation of the direction of the actuation force in the conveyor of FIG. 22A.
Figure 22C:
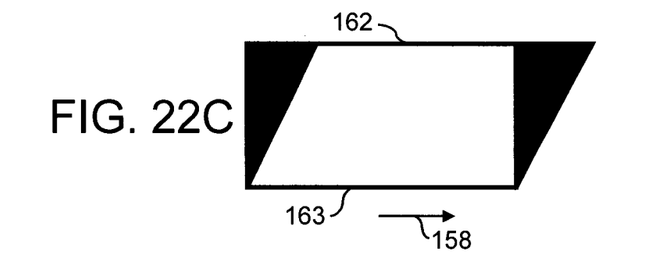
FIG. 22C is a schematic representation of the actuation force in the transport direction.
Figure 22D:
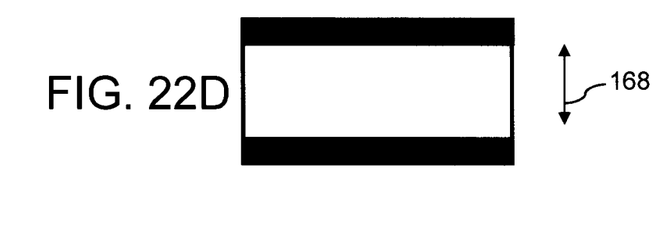
FIG. 22D is a schematic representation of the actuation force perpendicular to the transport direction.

The singulating conveyor 190 of FIG. 22A produces a force in the transport direction 158 that decreases from the left side 162 to the right side 163 as indicated by FIG. 22C. The actuation force in the transverse direction 168 is uniform along the length of the conveyor in regions near the left and right sides 162, 163 as indicated by FIG. 22D. The result is that the cans 122 at the left side 62 outpace the cans at the right side 63 so that rows of cans tend to pivot clockwise toward the center of the conveyor 190 as they advance in the transport direction 158.

Figure 23A:
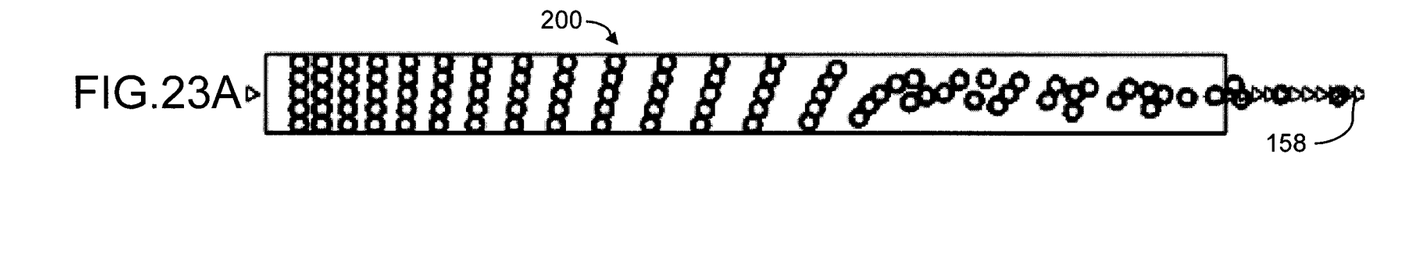
FIG. 23A is a top plan view of a fourth version of a singulating conveyor embodying features of the invention.
Figure 23B:
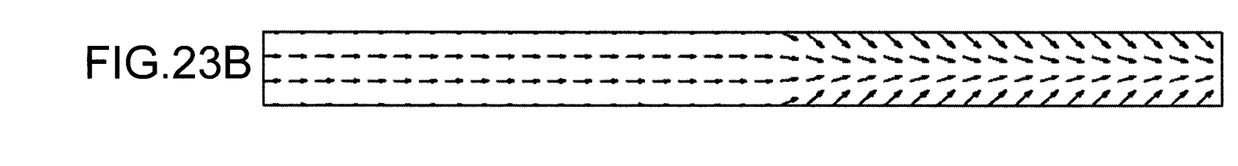
FIG. 23B is a schematic representation of the direction of the actuation force in the conveyor of FIG. 23A.
Figure 23C:
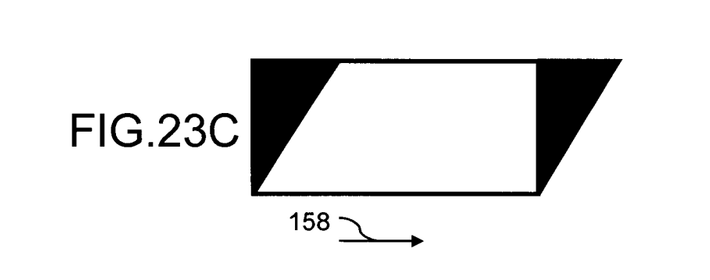
FIG. 23C is a schematic representation of the actuation force in the transport direction.
Figure 23D:
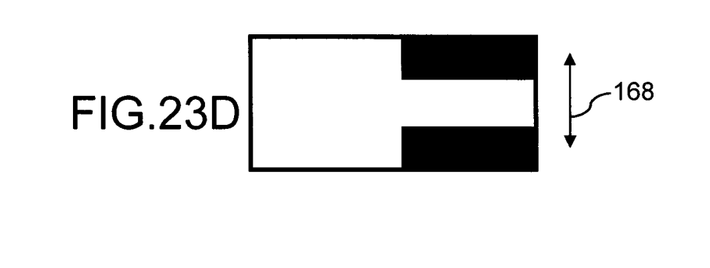
FIG. 23D is a schematic representation of the actuation force perpendicular to the transport direction.

The singulating conveyor 200 of FIG. 23A is similar to the conveyor 190 of FIG. 22A, except that the actuation force in the transverse direction 168 is applied only in regions close to the exit 125 and not at all in regions closer to the entrance 124. The result is that the rows of cans 122 take longer to pivot toward the center of the conveyor but are spaced apart a greater distance for a gentler merge.

Figure 24A:
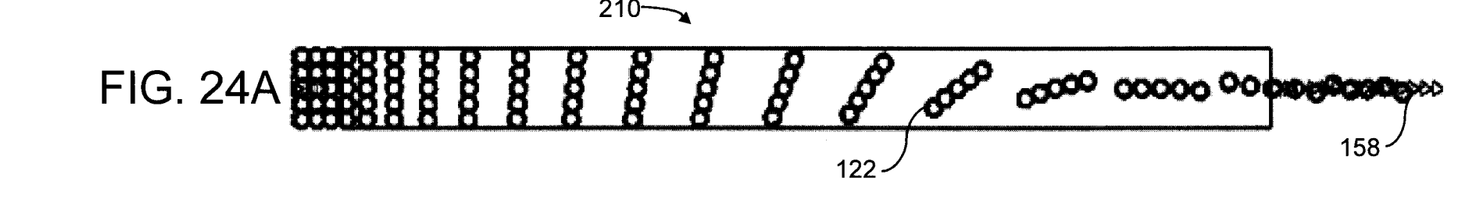
FIG. 24A is a top plan view of a fifth version of a singulating conveyor embodying features of the invention.
Figure 24B:
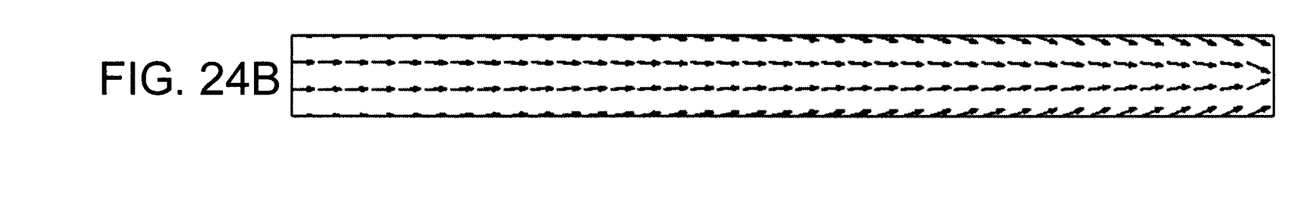
FIG. 24B is a schematic representation of the direction of the actuation force in the conveyor of FIG. 24A.
Figure 24C:
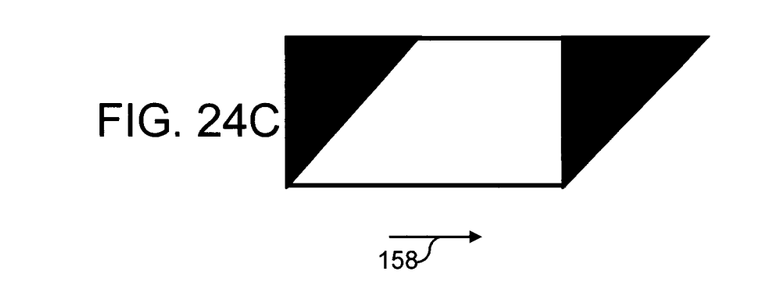
FIG. 24C is a schematic representation of the actuation force in the transport direction.
Figure 24D:
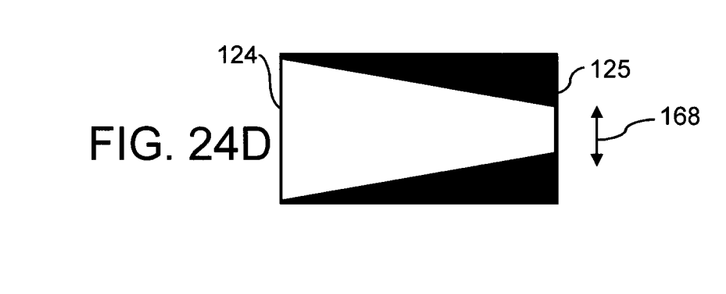
FIG. 24D is a schematic representation of the actuation force perpendicular to the transport direction.

The singulating conveyor 210 of FIG. 24A also pivots the rows of cans 122. One difference between the coil configuration of this conveyor and that of the conveyor 190 of FIG. 22A is that the gradient of the actuation force in the transport direction 158 is much greater, as depicted in FIG. 24C. And the actuating force in the transverse direction 168 increases from the entrance 124 to the exit 125. The effect is that the rows of cans 122 tend to separate upon entry because the actuation force at that point is mostly in the transport direction 158. Once the rows are separated, the increasing transverse force downstream causes the separated rows to start pivoting toward the center of the conveyor 210.

Aluminum bottles or cans were used throughout the description as exemplary electrically conductive conveyed articles. But other electrically conductive articles containing electrically conductive material, such as aluminum or copper, could be conveyed by the coils described. And the words "left" and "right" as used in reference to the particular layouts in the drawings are meant to be used interchangeably in the claims.

What is claimed is:

1. A conveyor system comprising:
   an electromagnetic conveyor including:
      a top surface extending in width from a left side to a right side and in length in a transport direction from an entrance to an exit;
      wherein electrically conductive articles are transferred onto the top surface at the entrance and transferred off the top surface at the exit;
      a plurality of coils arranged below the top surface and producing electromagnetic flux waves producing actuation forces that move the electrically conductive articles across the top surface from the entrance to the exit;
   a controller driving the coils with a train of pulses having a peak amplitude and a pulse width and an off-time sufficient to produce an average actuation force against the electrically conductive articles that exceeds the friction force between the top surface and the electrically conductive articles.

2. A conveyor system as in claim 1 wherein the peak amplitude of the drive pulses is great enough to ensure that the net force on the electrically conductive articles during the drive pulses is sufficiently greater than the friction force that friction does not affect the acceleration of the cans during the drive pulses.

3. A conveyor system as in claim 1 wherein the duty cycle is less than about 20%.

4. A conveyor system as in claim 1 wherein the pulse width of the pulses is less than about 5 ms.

5. A conveyor system as in claim 1 wherein the coils are arranged direct the actuation force against the electrically conductive articles to push the articles away from the left and right sides of the conveyor toward the center of the top surface while pushing the articles in the transport direction.

6. A conveyor system as in claim 1 wherein the coils under the center of the top surface are arranged to direct the actuation force only in the transport direction.

7. A conveyor system as in claim 1 wherein the actuation force directed perpendicular to the transport direction and toward the center of the top surface increases from the entrance to the exit.

8. A conveyor system as in claim 1 wherein the actuation force in the transport direction is greater at the left side than at the right side of the top surface.

9. A conveyor system as in claim 1 wherein there is no actuation force perpendicular to the transport direction in a portion of the conveyor extending from the entrance toward a location of the top surface short of the exit.

10. A conveyor system as in claim 1 wherein the actuation force perpendicular to the transport direction is uniform along the length of the conveyor from the entrance to the exit of the top surface.

11. A conveyor system as in claim 1 wherein the actuation force in the transport direction is greatest at the center of the top surface.

12. A conveyor system as in claim 1 wherein the length of the top surface is much greater than the width of the top surface.

* * * * *